(12) United States Patent
Ueda

(10) Patent No.: US 10,154,238 B2
(45) Date of Patent: Dec. 11, 2018

(54) PROJECTION SYSTEM AND MODELING MACHINE

(71) Applicant: Roland DG Corporation, Hamamatsu-shi, Shizuoka (JP)

(72) Inventor: Jun Ueda, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/809,197

(22) Filed: Nov. 10, 2017

(65) Prior Publication Data
US 2018/0139426 A1 May 17, 2018

(30) Foreign Application Priority Data

Nov. 11, 2016 (JP) ................................. 2016-220670
Nov. 11, 2016 (JP) ................................. 2016-220672

(51) Int. Cl.
*H04N 9/31* (2006.01)

(52) U.S. Cl.
CPC ......... *H04N 9/3185* (2013.01); *H04N 9/3147* (2013.01)

(58) Field of Classification Search
CPC ................................................ H04N 1/00283
USPC ........................................................ 348/744
See application file for complete search history.

(56) References Cited

U.S. PATENT DOCUMENTS

| | | | |
|---|---|---|---|
| 9,862,147 B2 * | 1/2018 | Jeng | ........................ B29C 64/124 |
| 2005/0078879 A1 * | 4/2005 | Sakurai | ................. G06T 3/0006 |
| | | | 382/275 |
| 2005/0190986 A1 * | 9/2005 | Sakurai | ................. G06T 3/0006 |
| | | | 382/275 |
| 2005/0206753 A1 * | 9/2005 | Sakurai | ..................... G06T 3/00 |
| | | | 348/241 |
| 2011/0058043 A1 * | 3/2011 | Choi | .................... H04N 9/3147 |
| | | | 348/177 |

(Continued)

FOREIGN PATENT DOCUMENTS

| | | |
|---|---|---|
| JP | 2015-016610 A | 1/2015 |
| JP | 2015-201760 A | 11/2015 |

*Primary Examiner* — Paulos M Natnael
(74) *Attorney, Agent, or Firm* — Keating & Bennett, LLP

(57) ABSTRACT

A projection system generates a pre-projective transformation image based on an extracted image obtained from a source image, applies projective transformation to the pre-projective transformation image using the parameters to produce an output image, and causes the projector assembly to output the output image and project a projected image on a surface for projection. If the extracted image has been obtained in a predetermined range of the source image, the projected image is projected onto the surface for projection so that an origin of the pre-projective transformation image is located at a predetermined position in the surface for projection. When, a change, from the predetermined range, of a range to extract in the source image to obtain the extracted image leads to a change of a coordinate of pixels of the pre-projective transformation image by a V pixel unit from a coordinate obtained when the extracted image has been obtained in the predetermined range, the output image is produced by translating the pre-projective transformation image by a V pixel and applying projective transformation to the pre-projective transformation image using the parameters.

9 Claims, 12 Drawing Sheets

(56) References Cited

U.S. PATENT DOCUMENTS

| | | | |
|---|---|---|---|
| 2015/0019000 A1* | 1/2015 | Nakamura | G05D 25/02 700/120 |
| 2015/0287169 A1* | 10/2015 | Ueda | B29C 67/0062 348/86 |
| 2016/0078590 A1* | 3/2016 | Aoki | G06T 5/006 382/275 |
| 2016/0200042 A1* | 7/2016 | Jeng | B29C 67/007 264/401 |
| 2016/0332367 A1* | 11/2016 | Sun | B29C 67/0062 |
| 2018/0029296 A1* | 2/2018 | Van Esbroeck | B29C 64/255 |

* cited by examiner

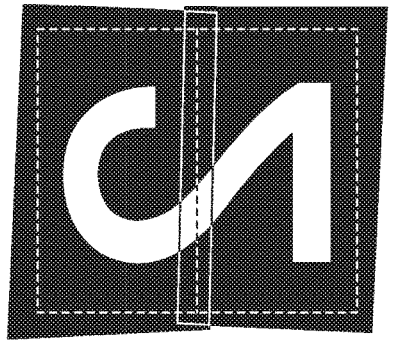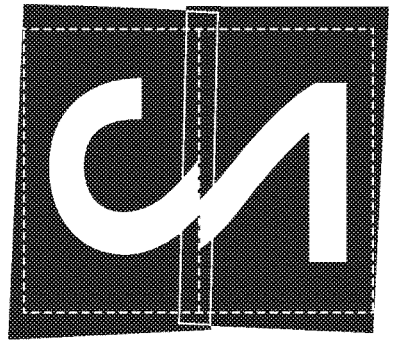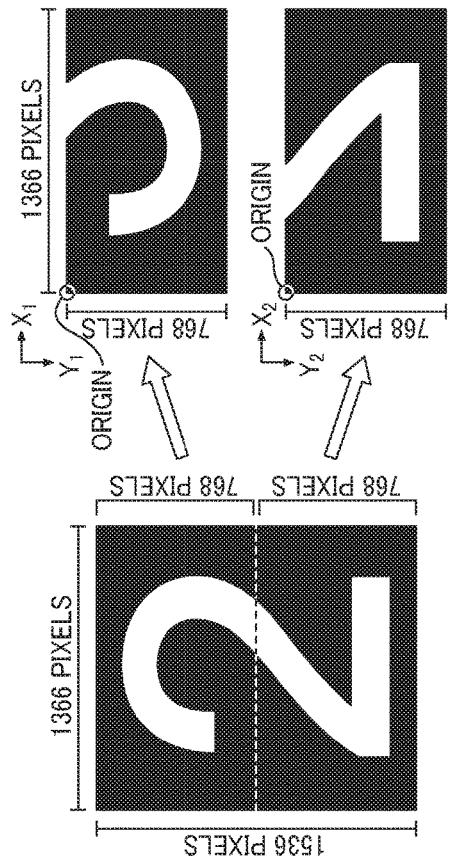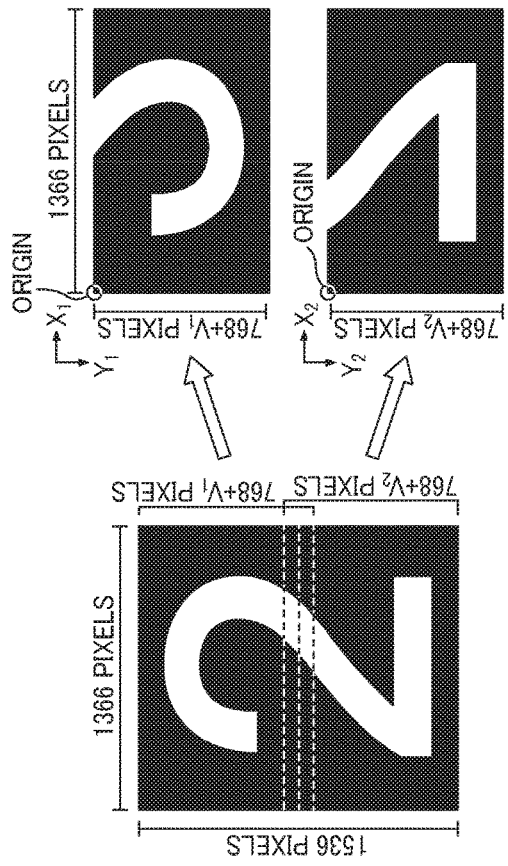
FIG. 5A  FIG. 5B

PROJECTION SYSTEM AND MODELING MACHINE

CROSS REFERENCE TO RELATED APPLICATIONS

This application claims the benefit of priority to Japanese Patent Application No. 2016-220670 filed on Nov. 11, 2016 and Japanese Patent Application No. 2016-220672 filed on Nov. 11, 2016. The entire contents of these applications are hereby incorporated herein by reference.

BACKGROUND OF THE INVENTION

1. Field of the Invention

The present invention relates to projection systems and modeling machines.

2. Description of the Related Art

Modeling machines for creating three-dimensional objects (3D modeled objects) by irradiating a photosensitive resin with a beam of light (such as visible light or ultraviolet light) have been known. For example, JP-A-2015-16610 and JP-A-2015-201760 describe modeling machines having two or more projector assemblies (projectors). Such modeling machines have a projection system to project images onto a surface for projection.

When an image is projected onto a surface for projection, the image on the surface for projection (projected image) can be distorted. Accordingly, such distortion of projected images is sometimes corrected by applying projective transformation to the images beforehand. The projection system of this type stores parameters beforehand to apply predetermined projective transformation.

By applying projective transformation to an image (extracted image/pre-projective transformation image) extracted from a source image to produce an output image and causing the projector assembly to project this output image, an image corresponding to the extracted image may be projected onto the surface for projection. In this case, however, a change of a range to extract in the source image to obtain images results in displacement of the image on the surface for projection. On the other hand, an attempt to change parameters for projective transformation every time when the range to extract in the source image to obtain images is changed in order to prevent the images from being displaced on the surface for projection will increase parameters to be stored.

SUMMARY OF THE INVENTION

Accordingly, it is desirable that the same parameters are used for projective transformation even after a range to extract in a source image to obtain images has been changed.

A preferred embodiment of the present invention makes it possible to arbitrarily change a range to extract in a source image to obtain an image without changing any parameter for projective transformation.

As described above, by applying projective transformation to an image (extracted image/pre-projective transformation image) extracted from a source image to produce an output image and causing the projector assembly to project this output image, an image corresponding to the extracted image may be projected onto the surface for projection. In this case, parameters for projective transformation are determined assuming that the extract images are obtained from the source image in the predetermined range, but one may need to change a range to extract in the source image to obtain images while using the same parameters.

Another preferred embodiment of the present invention calculates, in projecting an image corresponding to an extracted image obtained from a source image onto a surface for projection, a range in the source image from which images are able to be extracted.

According to a preferred embodiment of the present invention, a projection system includes a projector assembly, a storage that stores parameters for projective transformation; and a controller that generates a pre-projective transformation image based on an extracted image obtained from a source image by the controller, applies projective transformation to the pre-projective transformation image using the parameters to produce an output image, and causes the projector assembly to output the output image and project a projected image on a surface for projection, wherein in a case where the extracted image has been obtained in a predetermined range of the source image by the controller, the projected image is projected onto the surface for projection so that an origin of the pre-projective transformation image is located at a predetermined position in the surface for projection, and when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image.

Preferred embodiments of the present invention make it possible to arbitrarily change a range to extract in the source image to obtain an image without changing any parameter for projective transformation.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a graphical representation for describing a slice image that is halved.

FIG. 5B shows a problem that arises when images are extracted from the slice image so that portions of these images overlap.

DETAILED DESCRIPTION OF THE PREFERRED EMBODIMENTS

Figure 1:
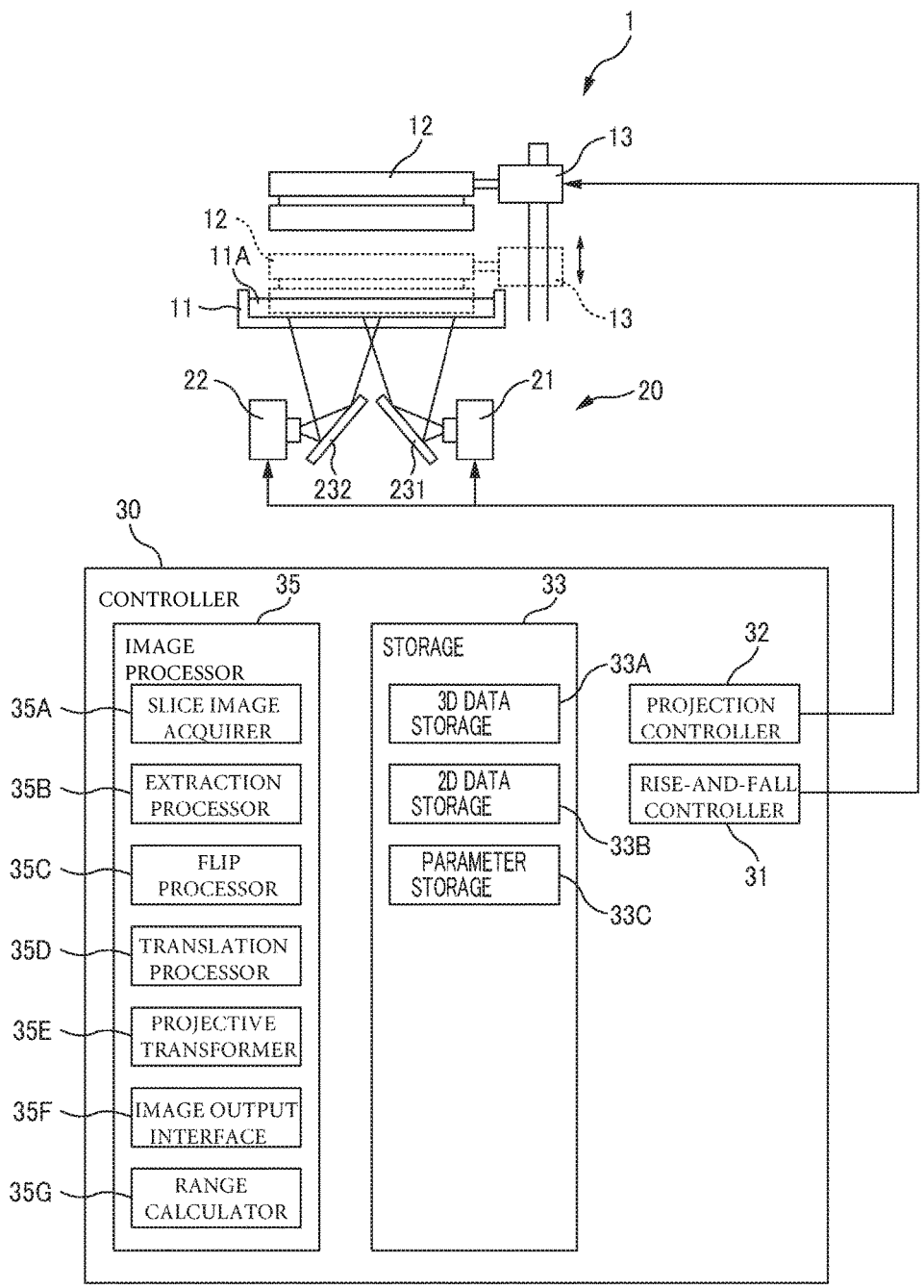
FIG. 1 is a diagram for describing a configuration of a modeling machine 1 according to a preferred embodiment of the present invention.

Description of preferred embodiments of the present invention will be provided below with reference to the drawings. Preferred embodiments of the present invention at least include the following.

A projection system including a projector assembly, a storage that stores parameters for projective transformation, and a controller that generates a pre-projective transformation image based on an extracted image obtained from a source image by the controller, applies projective transformation to the pre-projective transformation image using the parameters to produce an output image, and causes the projector assembly to output the output image and project a projected image on a surface for projection, wherein in a case where the extracted image has been obtained in a predetermined range of the source image by the controller, the projected image is projected onto the surface for projection so that an origin of the pre-projective transformation image is located at a predetermined position in the surface for projection, and when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image will be shown. Such a projection system makes it possible to arbitrarily change the range to extract in the source image to obtain images without changing any parameter for projective transformation.

It is desirable that the projector assembly includes a first projector and a second projector, and when the controller causes each of the first projector and the second projector to output the output image to project the projected images as a single image onto the surface for projection, the range to extract in the source image to obtain the extracted image is changed from the predetermined range so that an area onto which an image corresponding to the extracted image is projected by the first projector is overlapped with an area onto which an image corresponding to the extracted image is projected by the second projector. This prevents a boundary between the two projected images from being conspicuous.

It is desirable that, when a change, from the predetermined range, of the range to extract in the source image to obtain the extracted image does not lead to the change of the coordinate of the pixels obtained in the case where the extracted image has been obtained in the predetermined range, the output image is produced by applying projective transformation to, but not translating, the pre-projective transformation image. This makes it possible to arbitrarily change a range to extract in the source image to obtain images without changing any parameter for projective transformation.

It is desirable that the controller applies projective transformation to a white image of the predetermined range as the pre-projective transformation image to obtain the output image, detects a width of black pixels on an edge of the output image, and converts a dimension of the width in a coordinate system of the output image into a length in a coordinate system of the extracted image to calculate a range to extract in the source image from which the extract image can be obtained. This makes it possible to calculate a range within which a range to extract to obtain extracted images is capable of being set.

A modeling machine including a resin vat to contain a photosensitive resin and including a transparent bottom, a projector assembly that projects a projected image onto the bottom as a surface for projection, a storage that stores parameters for projective transformation, and a controller that generates a pre-projective transformation image based on an extracted image obtained from a source image by the controller, applies projective transformation to the pre-projective transformation image using the parameters to produce an output image, and causes the projector assembly to output the output image and project the projected image on the surface for projection, wherein in a case where the extracted image has been obtained in a predetermined range of the source image by the controller, the projected image is projected onto the surface for projection so that an origin of the pre-projective transformation image is located at a predetermined position in the surface for projection, and when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image will be shown. This modeling machine makes it possible to arbitrarily change a range to extract in the source image to obtain images without changing any parameter for projective transformation.

A projection system including a projector assembly, a storage that stores parameters for projective transformation, and a controller that generates a pre-projective transformation image based on an extracted image obtained from a source image by the controller, applies projective transformation to the pre-projective transformation image using the parameters to produce an output image, and causes the projector assembly to output the output image and project a projected image on a surface for projection, wherein in a case where the extracted image has been obtained in a predetermined range of the source image by the controller, the projected image is projected onto the surface for projection so that the pre-projective transformation image is located at a predetermined position in the surface for projection, and the controller applies projective transformation to a white image of the predetermined range as the pre-projective transformation image to obtain the output image, detects a width of black pixels on an edge of the output image, and converts a dimension of the width in a coordinate system of the output image into a length in a coordinate system of the extracted image to calculate a range to extract in the source image from which the extract image can be obtained will be shown. This projection system makes it possible to calculate, in projecting an image corresponding to an extracted image obtained from a source image onto a surface for projection, a range in the source image from which images are capable of being extracted.

It is desirable that the projector assembly includes a first projector and a second projector, and when the controller causes each of the first projector and the second projector to output the output image to project the projected images as a single image onto the surface for projection, the range to extract in the source image to obtain the extracted image is changed from the predetermined range so that an area onto which an image corresponding to the extracted image is projected by the first projector is overlapped with an area onto which an image corresponding to the extracted image is projected by the second projector. This prevents a boundary between the two projected images from being conspicuous.

It is desirable, when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image. This makes it possible to arbitrarily change a range to extract in the source image to obtain images without changing any parameter for projective transformation.

A modeling machine including a resin vat to contain a photosensitive resin and including a transparent bottom, a projector assembly that projects a projected image onto the bottom as a surface for projection, a storage that stores parameters for projective transformation, and a controller that generates a pre-projective transformation image based on an extracted image obtained from a source image by the controller, applies projective transformation to the pre-projective transformation image using the parameters to produce an output image, and causes the projector assembly to output the output image and project the projected image on the surface for projection, wherein in a case where the extracted image has been obtained in a predetermined range of the source image by the controller, the projected image is projected onto the surface for projection so that the pre-projective transformation image is located at a predetermined position in the surface for projection, and the controller applies projective transformation to a white image of the predetermined range as the pre-projective transformation image to obtain the output image, detects a width of black pixels on an edge of the output image, and converts a dimension of the width in a coordinate system of the output image into a length in a coordinate system of the extracted image to calculate a range to extract in the source image from which the extract image can be obtained will be shown. This modeling machine makes it possible to calculate, in projecting an image corresponding to an extracted image obtained from a source image onto a surface for projection, a range in the source image from which images are capable of being extracted.

First Preferred Embodiment

FIG. 1 is a diagram for describing a configuration of a modeling machine 1 according to a first preferred embodiment of the present invention. The modeling machine 1 according to this preferred embodiment is a machine that builds 3D objects by illuminating, layer by layer, the transparent bottom of a resin vat 11 containing a photosensitive resin 11A and moving the cured resin upward. The modeling machine 1 mainly includes the resin vat 11, a holder 12, an elevator 13, a projector assembly 20, and a controller 30. The modeling machine 1 includes a projection system with the projector assembly 20 and the controller 30.

The resin vat 11 is a basin to contain the photosensitive resin 11A. The bottom of the resin vat 11 is made of a material transparent to light and allows rays of light from the projector assembly 20 to pass through. Accordingly, the photosensitive resin 11A contained in the resin vat 11 (more precisely, the photosensitive resin 11A between the bottom of the resin vat 11 and the outer bottom surface of the holder 12 or a cured resin) is cured when a beam of light is projected by the projector assembly 20.

The holder 12 is a member to keep a modeled object (i.e., cured resin) attached to it. The holder 12 keeps a modeled object attached to its outer bottom surface. The holder 12 is able to be moved up and down by the elevator 13. During the building of an object, the holder 12 moves up by a predetermined distance (equal or substantially equal to the thickness of a cured resin layer) every time when a beam of light is projected by the projector assembly 20. As a result, a modeled object is built upside down at the bottom of the holder 12.

The elevator 13 is a device to move the holder 12 up and down. During the building, the elevator 13 intermittently moves the holder 12 up.

The projector assembly 20 is a device that projects images onto the bottom of the resin vat 11. In the following description, each image projected onto a surface for projection (in this preferred embodiment, the bottom of the resin vat 11) may be referred to as a "projected image." Bright areas (pixels) of the projected image are produced by a beam of light and the photosensitive resin 11A gets cured at the exposed areas. The projector assembly 20 includes a first projector and a second projector 22. The images from the two projectors are combined and projected as a single image onto the bottom of the resin vat 11. The first and second projectors 21 and 22 preferably have identical structures and are disposed opposite to each other. The first projector 21 includes a first output interface 21A that outputs images and the second projector 22 includes a second output interface 22A that outputs images. The projector assembly 20 includes a first mirror 231 and a second mirror 232. The first mirror 231 reflects the image outputted by the first output interface 21A of the first projector 21 onto the bottom of the resin vat 11. The second mirror 232 reflects the image outputted by the second output interface 22A of the second projector 22 onto the bottom of the resin vat 11.

The controller 30 is configured or programmed to control the modeling machine 1. The controller 30 may be, for example, a computer with a control program installed. The controller 30 is configured or programmed to include, for example, a rise-and-fall controller 31 and a projection controller 32. The rise-and-fall controller 31 has a function of controlling driving of the elevator 13. The projection controller 32 has a function of controlling operations of the projector assembly 20.

The controller 30 also includes a storage 33 that stores various data. The storage 33 includes, for example, a three-dimensional data storage 33A, a two-dimensional data storage 33B, and a parameter storage 33C. The three-dimensional data storage 33A stores 3D data for an object to be modeled. The two-dimensional data storage 33B stores 2D images. The 2D images include, for example, slice images (described later) produced from 3D data, extracted images (described later) obtained from slice images, pre-projective transformation images (described later), post-projective transformation images (described later), and output images (described later) outputted from the first output interface 21A of the first projector 21 and the second output interface 22A of the second projector 22. The parameter storage 33C stores various parameters such as those for projective transformation described later.

Figure 2:
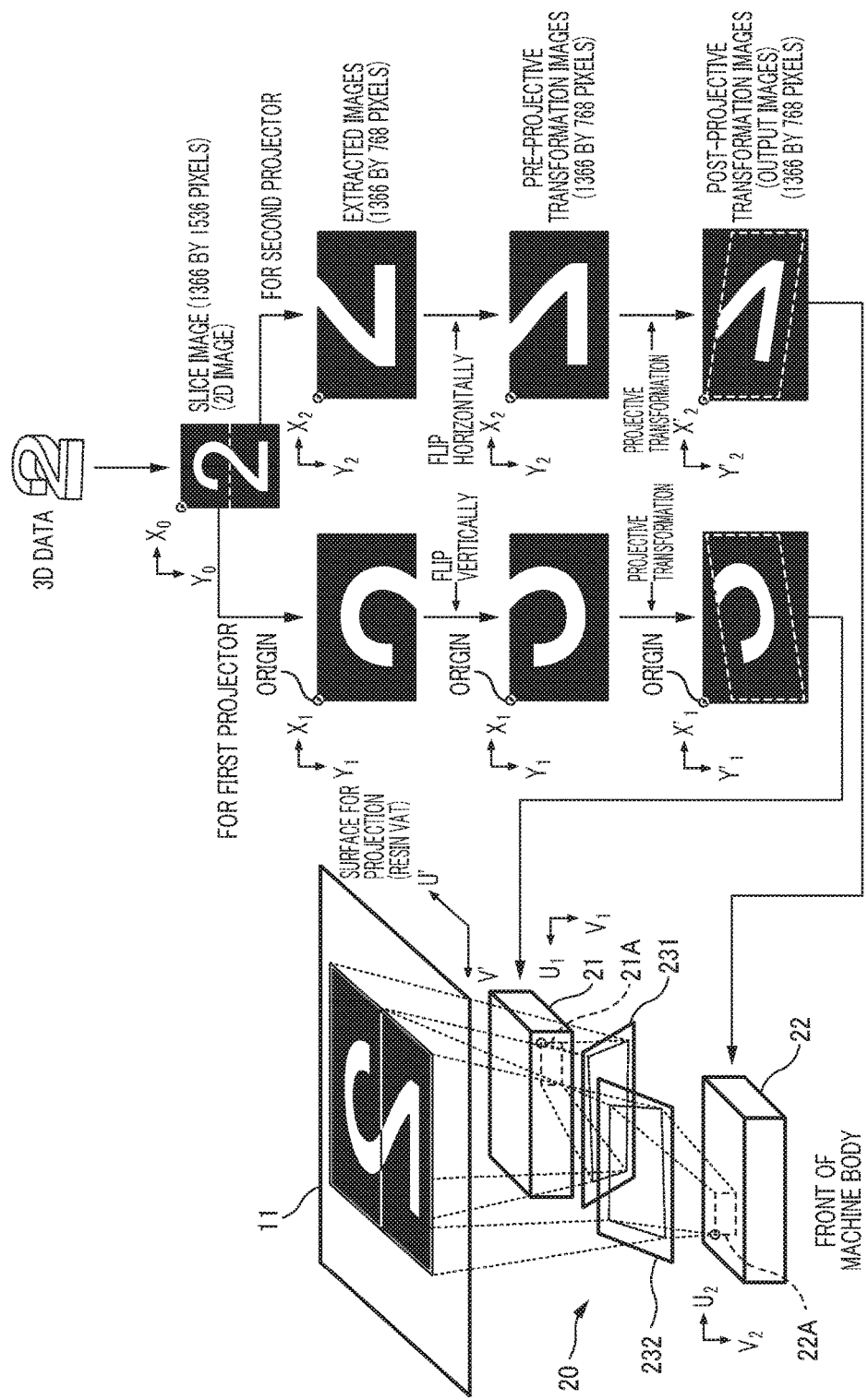
FIG. 2 is a graphical representation for describing functions of a typical image processor 35 without the translation processor 35D and the range detector 35G.

The controller 30 includes an image processor 35. The image processor 35 includes a slice image acquirer 35A, an extraction processor 35B, a flip processor 35C, a translation processor 35D, a projective transformer 35E, an image output interface 35F, and a range detector 35G. FIG. 2 is a graphical representation for describing functions of a typical image processor 35 without the translation processor 35D and the range detector 35G. By way of example, the object to be modeled is a 3D number "2." As shown in FIG. 2, a coordinate system at the exit of the i-th projector (i is either 1 or 2) may be referred to a "$U_i$-$V_i$ coordinate system." An origin of each coordinate system may be represented by a circle. A coordinate system in the surface for projection (the bottom of the resin vat 11) may be referred to as a "U'-V' coordinate system."

The slice image acquirer 35A acquires, based on 3D data of an object to be modeled, a 2D image (slice image) of a layer to be created. For example, the slice image acquirer 35A creates a 2D slice image representing a white "2" on a black background based on 3D data representing the 3D number "2." The slice image preferably has a resolution of 1366 by 1536 pixels, for example. A slice image which is the first 2D image may be referred to as a "source image." In the following description, a coordinate system in the slice image may be referred to as an "$X_0$-$Y_0$ coordinate system." Coordinates in the $X_0$-$Y_0$ coordinate system may be represented as "coordinates (x,y)." The origin of the $X_0$-$Y_0$ coordinate system is located at a corner (upper left corner in the slice image in FIG. 2) of the slice image.

The extraction processor 35B extracts images (extracted images) to be outputted by the projectors, based on the slice image. The extraction processor 35B halves the slice image and extracts upper and lower areas of the slice image as the images to be outputted by the first and second projectors 21 and 22, respectively. Each of the two halves of the slice image preferably has a resolution of 1366 by 768 pixels, for example. Although halving the slice image in this preferred embodiment, the extraction processor 35B may extract images in any areas.

In the following description, a coordinate system in the extracted image of the i-th projector (i is either 1 or 2) may be referred to as an "$X_i$-$Y_i$ coordinate system." Coordinates in the $X_i$-$Y_i$ coordinate system may be represented as "coordinates ($x_i$,$y_i$)" or "coordinates (x,y)." The origin of the $X_i$-$Y_i$ coordinate system is located at a corner (upper left corner in the extracted image in FIG. 2) of the extracted image.

The flip processor 35C flips the extracted images in a certain direction. The flip processor 35C in this preferred embodiment flips the extracted image for the first projector vertically and flips the extracted image for the second projector 22 horizontally. It should be noted that the flip processor 35C may be omitted depending on the arrangement of the projectors of the projector assembly 20.

Each flipped image has a resolution equal or substantially equal to that of the extracted image (e.g., a resolution of 1366 by 768 pixels in this preferred embodiment). In the following description, the "$X_i$-$Y_i$ coordinate system" is also used as a coordinate system in the flipped image. The origin of the $X_i$-$Y_i$ coordinate system is located at a corner (upper left corner in the flipped image in FIG. 2) of each flipped image (pre-projective transformation image).

The projective transformer 35E applies projective transformation to the extracted images (flipped extracted images). This operation is to correct distortion (such as keystoning) of the image projected.

Figure 3:
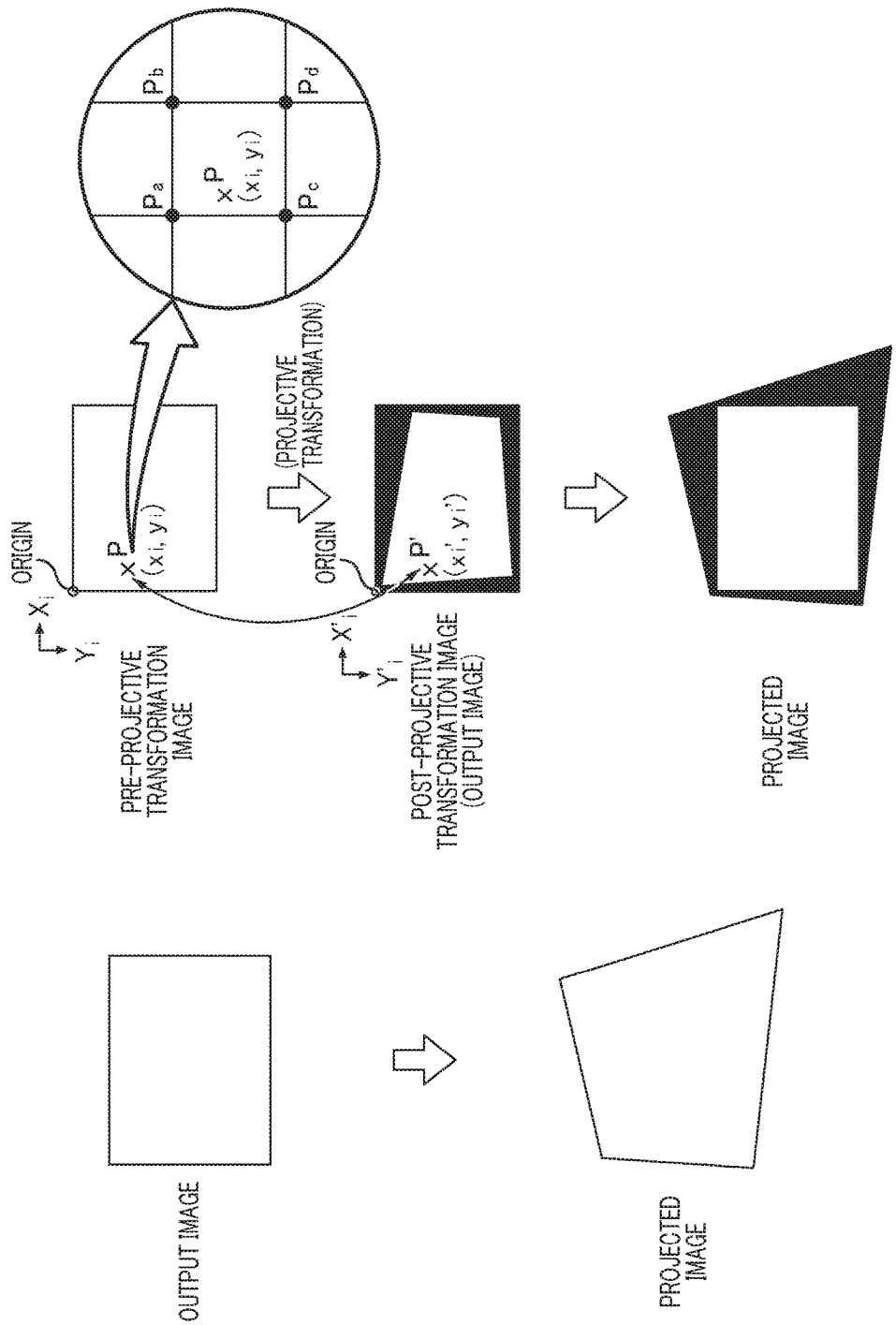
FIG. 3 is a graphical representation for describing an operation to apply projective transformation.

FIG. 3 is a graphical representation for describing an operation to apply projective transformation. As shown to the left, an image (outputted image) on the surface for projection may be distorted when a rectangular image (output image) is outputted by a projector without any further processing. Such distortion of images on the surface for projection is able to be corrected by measuring the distortion of an image on the surface for projection beforehand, correcting the image using a nomography matrix of parameters depending on the distortion, and causing each projector to output a post-projective transformation image (see, the right side of FIG. 3).

Given coordinates in a pre-projective transformation image are represented as ($x_i$,$y_i$) and coordinates in a post-projective transformation image are represented as ($x_i$',$y_i$'), and a homography matrix is $H_i$, then the relationship between the coordinates before and after the application of the projective transformation can be put into a matrix form as follows.

$$\begin{pmatrix} x'_i \\ y'_i \\ 1 \end{pmatrix} = H_i \cdot \begin{pmatrix} x_i \\ y_i \\ 1 \end{pmatrix}, H_i = \begin{pmatrix} h_{11i} & h_{12i} & h_{13i} \\ h_{21i} & h_{22i} & h_{23i} \\ h_{31i} & h_{32i} & h_{33i} \end{pmatrix}$$

Parameters ($h_{11i}$ to $h_{33i}$) of the homography matrix $H_i$ are values calculated beforehand depending on the distortion of images on the surface for projection and are stored in the parameter storage 33C. Furthermore, the parameter storage 33C is also provided with parameters of a homography matrix $H_1$ for the first projector 21 and parameters of a homography matrix $H_2$ for the second projector beforehand.

In order to generate 2D data of a post-projective transformation image, it is necessary that each pixel after the application of the projective transformation has coordinates ($x_i$' and $y_i$') as integers. To this end, the projective transformer 35E performs, for example, the following operation. First, the projective transformer 35E computes coordinates P($x_i$,$y_i$) in the pre-projective transformation image corresponding to integer coordinates P'($x_i$',$y_i$') of pixels of the post-projective transformation image, based on the homography matrix $H_i$ (inverse transformation). Next, the projective transformer 35E interpolates a color value of a pixel having coordinates P($x_i$,$y_i$) based on color values of pixels (such as $P_a$ to $P_d$ in FIG. 3) having integer coordinates located around the computed coordinates P($x_i$,$y_i$) and determines the interpolated value as a color value at the integer coordinates $P(x_i', y_i')$ in the post-projective transformation image. This interpolation is able to be achieved by, for example, bilinear interpolation. In this way, the projective transformer 35E obtains color values of the pixels of each post-projective transformation image to generate the post-projective transformation image.

It should be noted that coordinates $(x_i, y_i)$ in the pre-projective transformation image corresponding to the integer coordinates $(x_i', y_i')$ in the post-projective transformation image are able to be located outside the area of the pre-projective transformation image. In such a case, as shown in FIG. 3, the color value of each pixel located outside the area of the pre-projective transformation image is set to black (the darkest luminance level) to interpolate the color values at the integer coordinates $(x_i', y_i')$ in the post-projective transformation image.

The resolution of each post-projective transformation image preferably is identical to that of images supplied to the first and second projectors 21 and 22. Specifically, each post-projective transformation image has a resolution of 1366 by 768 pixels, for example.

The image output interface 35F supplies data of the post-projective transformation images to the first and second projectors 21 and 22, respectively. The image output interface 35F may apply, for example, shading of the image if necessary to the post-projective transformation images before supplying the data of the images to the first and second projectors 21 and 22, respectively. In the following description, for the purpose of simplification, it may be assumed that the data of the post-projective transformation images are supplied to the projectors and each coordinate system of the output image supplied to the associated projector may be referred to as an "$X_i'$-$Y_i'$ coordinate system."

As shown in FIG. 2, the first projector 21 outputs an image (output image) from its output interface based on the post-projective transformation image. Likewise, the second projector 22 outputs an image (output image) from its output interface based on the post-projective transformation image. The images supplied from these two projectors are combined into a single image and projected onto the bottom of the resin vat 11 which is the surface for projection.

Figure 4A:
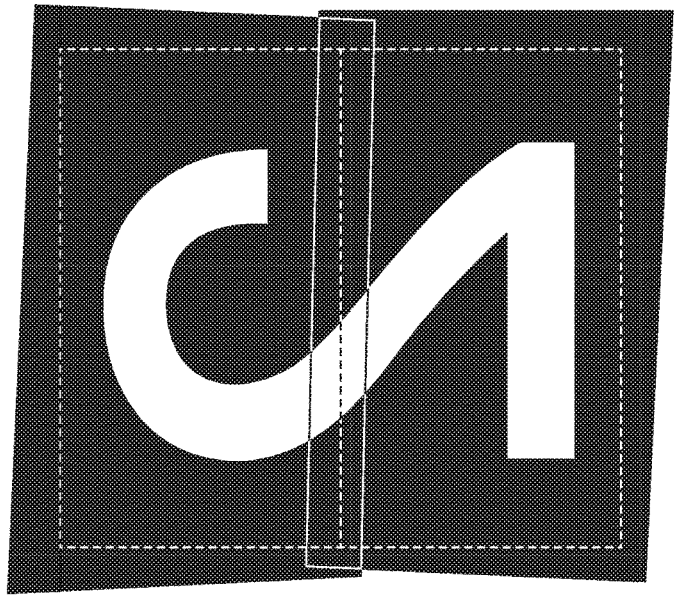
FIGS. 4A and 4B are graphical representations showing a positional relationship between a projection area and a modeling area on a surface for projection for each of a first projector 21 and a second projector 22.
Figure 4B:
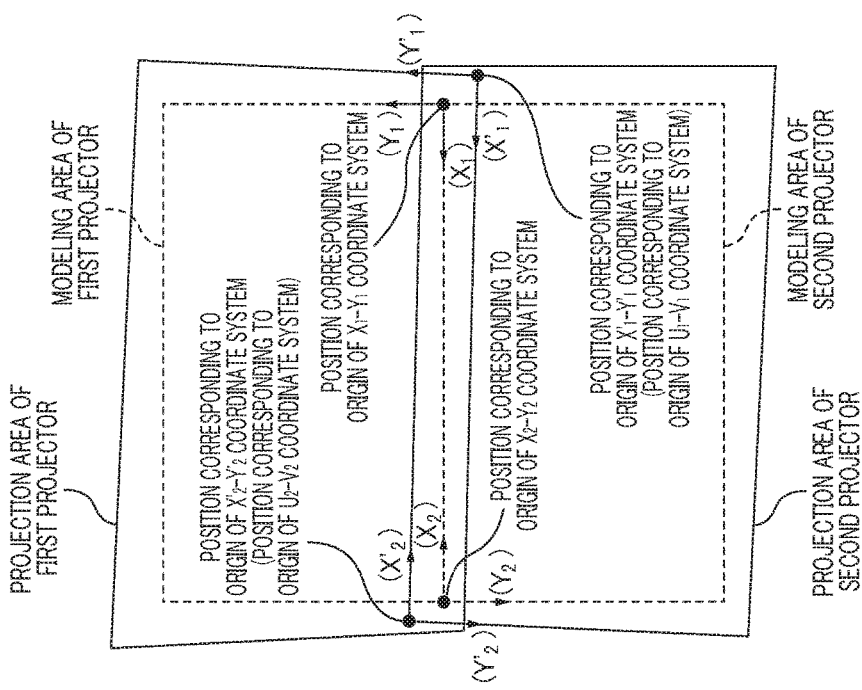

FIGS. 4A and 4B are graphical representations showing a positional relationship between a projection area and a modeling area on the surface for projection for each of the first projector 21 and the second projector 22. In FIG. 4A, the projection areas are depicted by a solid line and the modeling areas are depicted by a dotted line.

The projection area is an area that the projector is able to cover (see, the solid line in FIG. 4A). As described above, an image on the surface for projection is distorted even when a rectangular image is outputted by the projector. The projection area thus looks trapezoidal. The projection areas of the first and second projectors 21 and 22 overlap (adjacent to) each other in the V-direction and the overlapped area has a strip shape extending in the U-direction.

The modeling area is an area where an image corresponding to a slice image (or an extracted image) is projected (see, the dotted line in FIG. 4A). The modeling area is rectified via the aforementioned projective transformation so that it looks rectangular. In FIG. 4A, the modeling areas of the first and second projectors 21 and 22 are adjacent to each other in the V-direction and the boundary between them extends in the U-direction. In other words, the parameters ($h_{11i}$ to $h_{33i}$: see, the homography matrix given above) of the homography matrix $H_i$ ($H_1$ and $H_2$) are determined so that the two extracted images obtained by halving the slice image lie adjacent to each other in the V-direction. It should be noted that the modeling areas of the first and second projectors 21 and 22 may also be overlapped with each other as described later.

A portion of the projection area outside the modeling area is not illuminated. Since the color value of each pixel located outside the area of the pre-projective transformation image is set to black (the darkest luminance level) in applying the projective transformation, as shown in FIG. 3, that portion of the projection area outside the modeling area is not illuminated.

FIG. 5A is a graphical representation for describing a slice image that is halved. The procedure shown in FIG. 5A is already described. The portion of the portion of the figure to the left in FIG. 5A shows a slice image. It has a resolution of 1366 by 1536 pixels in this preferred embodiment, for example. The figure at the center in FIG. 5A shows flipped versions of the halves of the slice image before application of projective transformation. Each of these pre-projective transformation images preferably has a resolution of 1366 by 768 pixels, for example. Furthermore, the origin of each pre-projective transformation image (i.e., the origin of the $X_i$-$Y_i$ coordinate system) is located at the upper left corner of each rectangle. An $X_i$ axis of the pre-projective transformation image lies along the line corresponding to the boundary between the halves of the slice image. The portion of the figure to the right in FIG. 5A shows a projected image on the surface for projection. As has already been described, the parameters ($h_{11i}$ to $h_{33i}$: see, the homography matrix given above) of the homography matrix $H_i$ ($H_1$ and $H_2$) are determined so that the two extracted images obtained by halving the slice image lie adjacent to each other in the V-direction. As a result, an image (corresponding to the extracted image) for the upper half of the slice image is projected onto the modeling area of the first projector 21 and an image (corresponding to the extracted image) for the lower half of the slice image is projected onto the modeling area of the second projector 22. The two extracted images obtained by halving the slice image are adjacent to each other in the V-direction.

FIG. 5B shows a problem that arises when images are extracted from the slice image so that portions of these images overlap.

The portion of the portion of the figure to the left in FIG. 5B shows a slice image. As shown in FIG. 5B, the extraction processor 35B extracts, as an image to be outputted by the first projector 21, an upper portion of the slice image at a size of 1366 by (768+$V_1$) pixels so that the extracted image is extended, in a $Y_0$-direction, by $V_1$ pixel(s) from the boundary between the halves which correspond to the predetermined ranges. The region extended by $V_1$ pixel(s) in the $Y_0$-direction overlaps an area extracted as an image to be outputted by the second projector 22. Furthermore, the extraction processor 35B extracts, as the image to be outputted by the second projector 22, a lower portion of the slice image at a size of 1366 by (768+$V_2$) pixels so that the extracted image is extended, in the $Y_0$-direction, by $V_2$ pixel(s) from the boundary between the halves. The region extended by $V_2$ pixel(s) in the $Y_0$-direction overlaps the area extracted as the image to be outputted by the second projector 21. The two extracted images thus overlap by $V_1+V_2$ pixels in the $Y_0$-direction.

In this preferred embodiment, the range for extraction is extended by $V_i$ ($V_1$ or $V_2$) pixel(s) from the boundary between the predetermined ranges (each 1366 by 768 pixels) and the value of this $V_i$ is able to be determined (varied) arbitrarily. The value of $V_i$, however, has an applicable limit (upper limit) and therefore, the extraction processor 35B determines any value of the $V_i$ within the applicable range. How to calculate an upper limit of the applicable $V_i$ is described later.

The portion of the figure at the center in FIG. 5B shows flipped versions of the extracted images before application of projective transformation. Each of these pre-projective transformation images preferably has a resolution of 1366 by (768+$V_i$) pixels, for example. Furthermore, the origin of each pre-projective transformation image (i.e., the origin of the $X_i$-$Y_i$ coordinate system) is located at the upper left corner of each rectangle.

The coordinates of the pixels of the pre-projective transformation images in the portion of the figure at the center in FIG. 5B have changed, by $V_i$ pixel unit(s) in a $Y_i$-direction, from the coordinates obtained in the case (where the extracted images are obtained in the predetermined ranges) in FIG. 5A. For example, the pixel at the origin of each pre-projective transformation image in the portion of the figure at the center in FIG. 5A is displaced at a distance of $V_i$ pixel unit(s) in the $Y_i$-direction in the pre-projective transformation image in the portion of the figure at the center in FIG. 5B.

The portion of the figure to the right in FIG. 5B shows a projected image on the surface for projection. As has already been described, the parameters ($h_{11i}$ to $h_{33i}$: see, the homography matrix given above) of the homography matrix $H_i$ ($H_1$ and $H_2$) are determined so that the two extracted images lie adjacent to each other in the V-direction. Accordingly, the application of the aforementioned projective transformation alone to the images shown in the portion of the figure at the center in FIG. 5B results in the projection of an image that is different from the slice image, as shown in the portion of the figure to the right in FIG. 5B in which the modeling areas of the first and second projectors 21 and 22 do not overlap. This is because, although the coordinates of the pixels of the pre-projective transformation images in the portion of the figure at the center in FIG. 5B are different by $V_i$ pixel unit(s) as compared to the images in the portion of the figure at the center in FIG. 5A, the same projective transformation as the one described above is applied to the pre-projective transformation images in the portion of the figure at the center in FIG. 5B. The images on the surface for projection are thus displaced.

Figure 6:
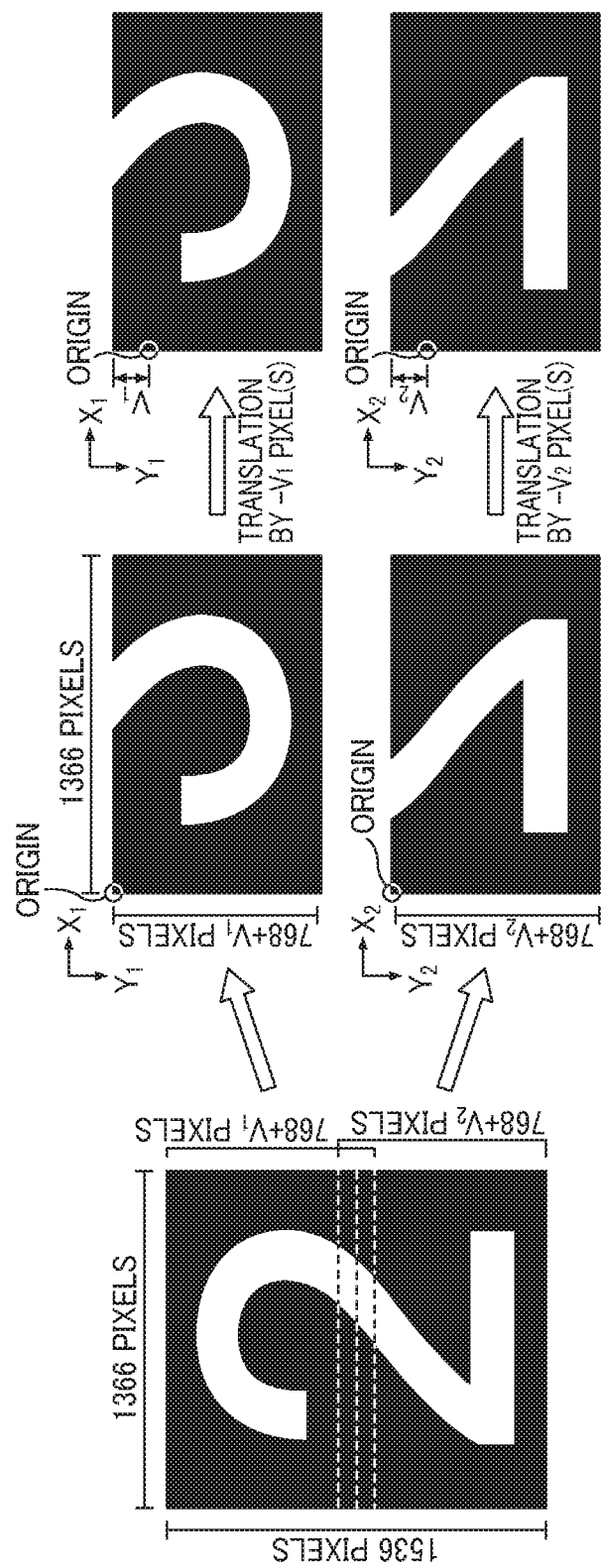
FIG. 6 is a graphical representation for describing translation.

In order to solve the problem shown in FIG. 5B, the image processor 35 according to this preferred embodiment includes the translation processor 35D (see, FIG. 1). FIG. 6 is a graphical representation for describing translation.

The portion of the figure to the left in FIG. 6 shows a slice image, which is identical to the portion of the figure to the left in FIG. 5B. The extraction processor 35B in this preferred embodiment extracts, as the image to be outputted by the first projector 21, an upper portion of the slice image at a size of 1366 by (768+$V_1$) pixels so that the extracted image is extended, in the $Y_0$-direction, by $V_1$ pixel(s) from the boundary between the halves. Likewise, the extraction processor 35B extracts, as the image to be outputted by the first projector 22, a lower portion of the slice image at a size of 1366 by (768+$V_2$) pixels so that the extracted image is extended, in the $Y_0$-direction, by $V_2$ pixel(s) from the boundary between the halves.

The portion of the figure at the center in FIG. 6 shows flipped versions of the extracted images before application of translation. Each of these pre-translation images has a resolution of 1366 by (768+$V_1$) pixels. Furthermore, the origin of each pre-translation image (i.e., the origin of the $X_i$-$Y_i$ coordinate system) is located at the upper left corner of each rectangle.

The portion of the figure to the right in FIG. 6 shows images after the application of translation to the flipped images. In the translated images, the position of the origin is displaced at a distance of $V_1$ pixel(s) in the $Y_i$-direction, as compared to the images before translation. In other words, the coordinates of the pixels of the translated images have changed by $V_1$ pixel unit(s) in the negative $Y_i$-direction.

Given coordinates in a pre-translation image are represented as $(x_i,y_i)$ and coordinates in a post-translation image are represented as $(x_i'',y_i'')$, and a translation matrix is $T_i$, then the relationship between the coordinates before and after the translation can be put into a matrix form as follows.

$$\begin{pmatrix} x_i'' \\ y_i'' \\ 1 \end{pmatrix} = T_i \cdot \begin{pmatrix} x_i \\ y_i \\ 1 \end{pmatrix}, T_i = \begin{pmatrix} 1 & 0 & 0 \\ 0 & 1 & -V_i \\ 0 & 0 & 1 \end{pmatrix}$$

The translation processor 35D is configured or programmed to set parameters $V_1$ ($V_1$ and $V_2$) of the translation matrix $T_i$ depending on the range to extract to obtain each extracted image.

Figures 7A, 7B:
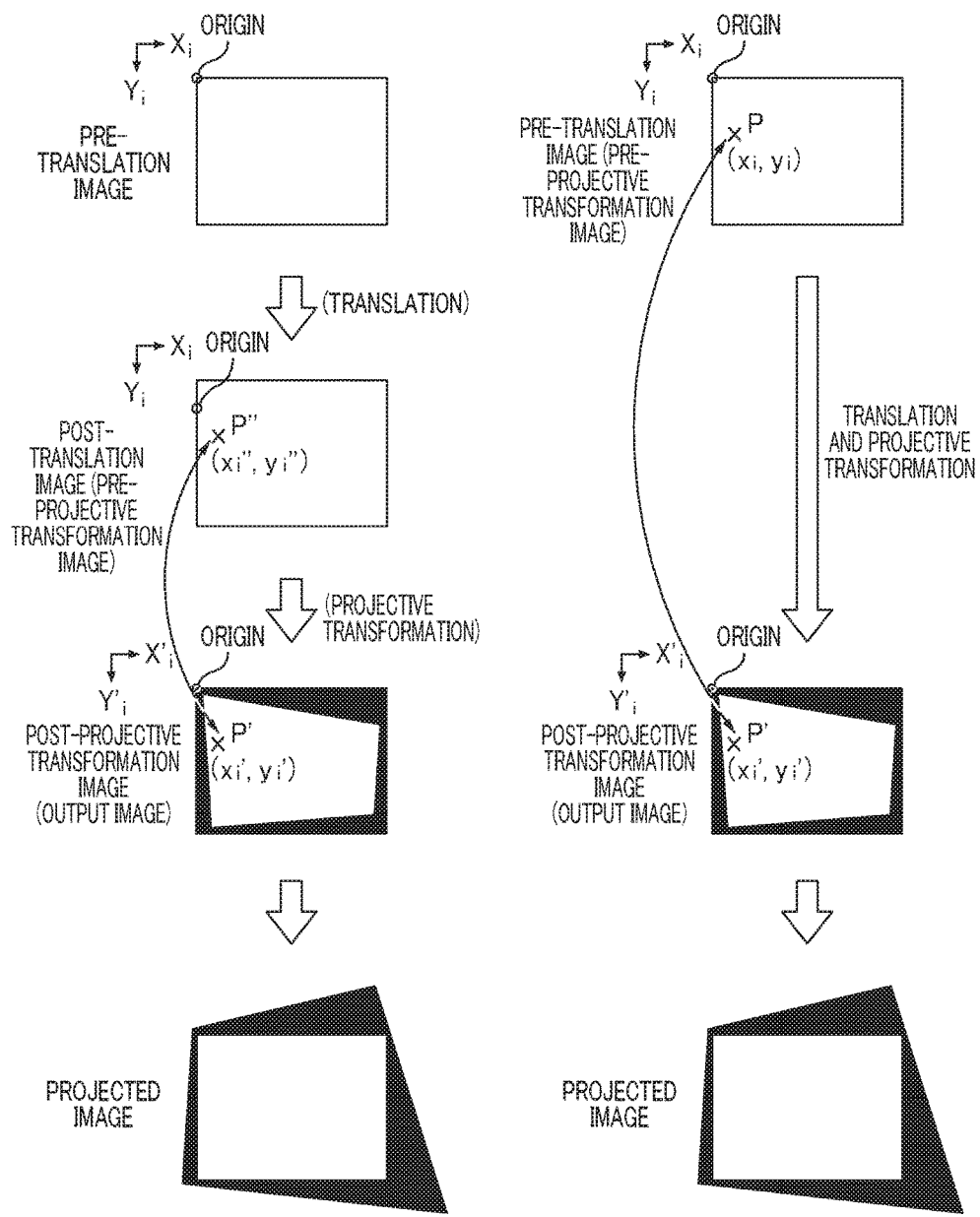
FIG. 7A is a graphical representation for describing operations performed by an image processor 35 to apply translation and projective transformation.
FIG. 7B is a graphical representation for describing other operations performed by the image processor 35 to apply translation and projective transformation.

FIG. 7A is a graphical representation for describing operations performed by the image processor 35 to apply translation and projective transformation. In this preferred embodiment, the image processor 35 translates the flipped images (pre-translation images) and applies projective transformation to the translated images to generate the output images. To this end, the projective transformer 35E performs, for example, the following operation. First, the projective transformer 35E computes coordinates $P''(x_i'',y_i'')$ of in the pre-projective transformation image (translated image) corresponding to integer coordinates $P'(x_i',y_i')$ of pixels of the post-projective transformation image, based on the nomography matrix (inverse transformation). Next, the projective transformer 35E interpolates a color value of a pixel having coordinates $P''(x_i'',y_i'')$ based on color values of pixels having integer coordinates located around the computed coordinates $P''(x_i'',y_i'')$ and determines the interpolated value as a color value at the integer coordinates $P'(x_i',y_i')$ in the post-projective transformation image. In this way, the projective transformer 35E obtains color values of the pixels of each post-projective transformation image to generate the output image.

FIG. 7B is a graphical representation for describing other operations performed by the image processor 35 to apply translation and projective transformation. It is used that, given coordinates in a flipped image (pre-translation image) are represented as $(x_i,y_i)$, and coordinates in an image after the application of translation and projective transformation are represented as $(x_i',y_i')$, as well as a translation matrix is $T_i$ and a homography matrix is $H_i$, then the relationship between the coordinates before and after the application of the translation and projective transformation can be put into a form as follows.

$$\begin{pmatrix} x_i' \\ y_i' \\ 1 \end{pmatrix} = H_i \cdot T_i \cdot \begin{pmatrix} x_i \\ y_i \\ 1 \end{pmatrix}$$

Figure 8B:
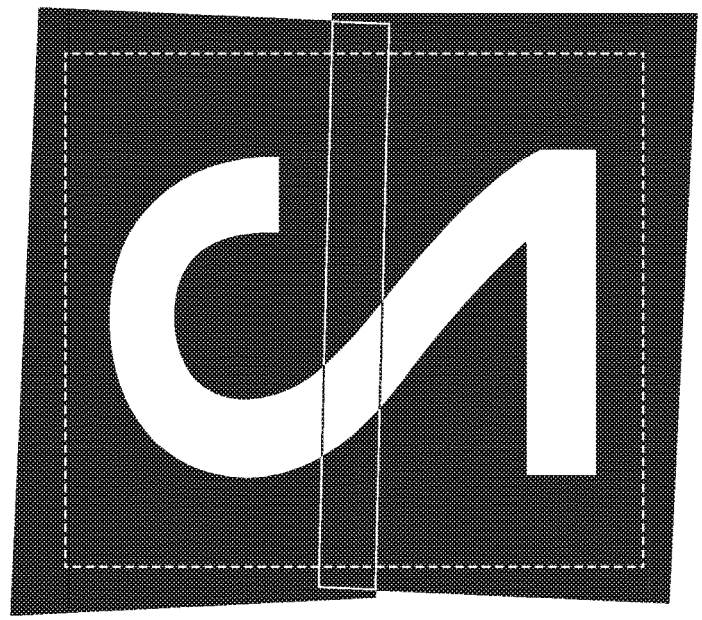
FIGS. 8A and 8B are graphical representations showing a positional relationship between projection areas and modeling areas of first and second projectors 21 and 22 on a surface for projection.
Figure 8A:
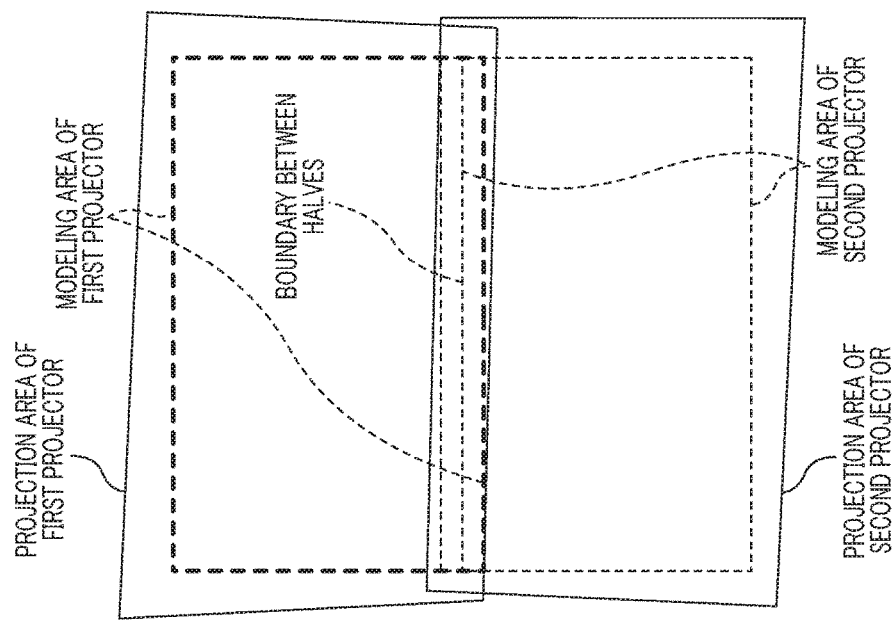

Specifically, the image processor 35 computes coordinates $P(x_i, y_i)$ in the pre-translation image corresponding to integer coordinates $P'(x_i', y_i')$ of pixels of the post-projective transformation image (output image), based on the translation matrix $T_i$ and the homography matrix $H_i$ (inverse transformation). Next, the image processor 35 interpolates a color value of a pixel having coordinates $P(x_i, y_i)$ based on color values of pixels having integer coordinates located around the computed coordinates $P(x_i, y_i)$ and determines the interpolated value as a color value at the integer coordinates $P'(x_i', y_i')$ in the post-projective transformation image. In this way, the image processor 35 is also able to generate the output image by obtaining color values of the pixels of each image to which translation and projective transformation has been applied FIGS. 8A and 8B are graphical representations showing a positional relationship between the projection areas and the modeling areas of the first and second projectors 21 and 22 on the surface for projection. In FIG. 8A, the projection areas are depicted by a solid line and the modeling areas are depicted by a dotted line.

The projection areas shown in FIG. 8A have the same range as those in FIG. 4A. In contrast, the modeling area of the first projector 21 shown in FIG. 8A is extended toward the modeling area of the second projector 22 (i.e., downward in the figure) as compared to FIG. 4A. This is because the extraction processor 35B extracts the image as the extracted image so that it is extended in the $Y_0$-direction by $V_1$ pixel(s) from the boundary between the halves and then the pre-projective transformation image is translated by $V_1$ pixel(s) in application of the projective transformation (see, FIG. 6). Likewise, the modeling area of the second projector 22 shown in FIG. 8A is extended toward the modeling area of the first projector 21 (i.e., upward in the figure) as compared to FIG. 4A. This is also because the extraction processor 35B extracts the image as the extracted image so that it is extended in the $Y_0$-direction by $V_2$ pixel (s) from the boundary between the halves and then the pre-projective transformation image is translated by $V_2$ pixel(s) in application of the projective transformation (see, FIG. 6). As a result, in this preferred embodiment, the modeling areas of the first and second projectors 21 and 22 overlap each other in the V-direction and the overlapped area of the modeling area has a strip shape extending in the U-direction. The width of the overlap of the modeling area is equal to the width of $V_1 + V_2$ pixels in the slice image.

In this preferred embodiment, translation by $V_1$ pixel(s) corresponding to the amount of change of the extracted area allows to prevent misalignment of the images on the surface for projection even without changing any parameter for projective transformation. The overlap of the modeling areas of the first and second projectors 21 and 22 in this preferred embodiment prevents the boundary between the two modeling areas from being conspicuous when the images projected by the two projectors are cast as a single image. Furthermore, with the modeling machine 1 having the aforementioned projection system, no visible line is formed on a cured resin layer.

As described above, when the modeling area of the first projector 21 is overlapped with the modeling area of the second projector 22, the extraction processor 35B of the image processor 35 extracts the upper portion of the slice image at a size of 1366 by (768+$V_1$) pixels so that the extracted image is extended, in the $Y_0$-direction, by $V_1$ pixel(s) from the boundary (reference boundary) between the halves. Likewise, when the modeling area of the second projector 22 is overlapped with the modeling area of the first projector 21, the extraction processor 35B of the image processor 35 extracts the lower portion of the slice image at a size of 1366 by (768+$V_2$) pixels so that the extracted image is extended, in the $Y_0$-direction, by $V_2$ pixel(s) from the boundary (reference boundary) between the halves. In other words, $V_i$ ($V_1$ and $V_2$, i=1, 2) is a value to define a range to extract to obtain the extracted image as well as to define an amount of the overlap between the modeling areas. Although the following description shows an upper limit of $V_1$ that can be set, the same applies to $V_2$.

Figure 9:
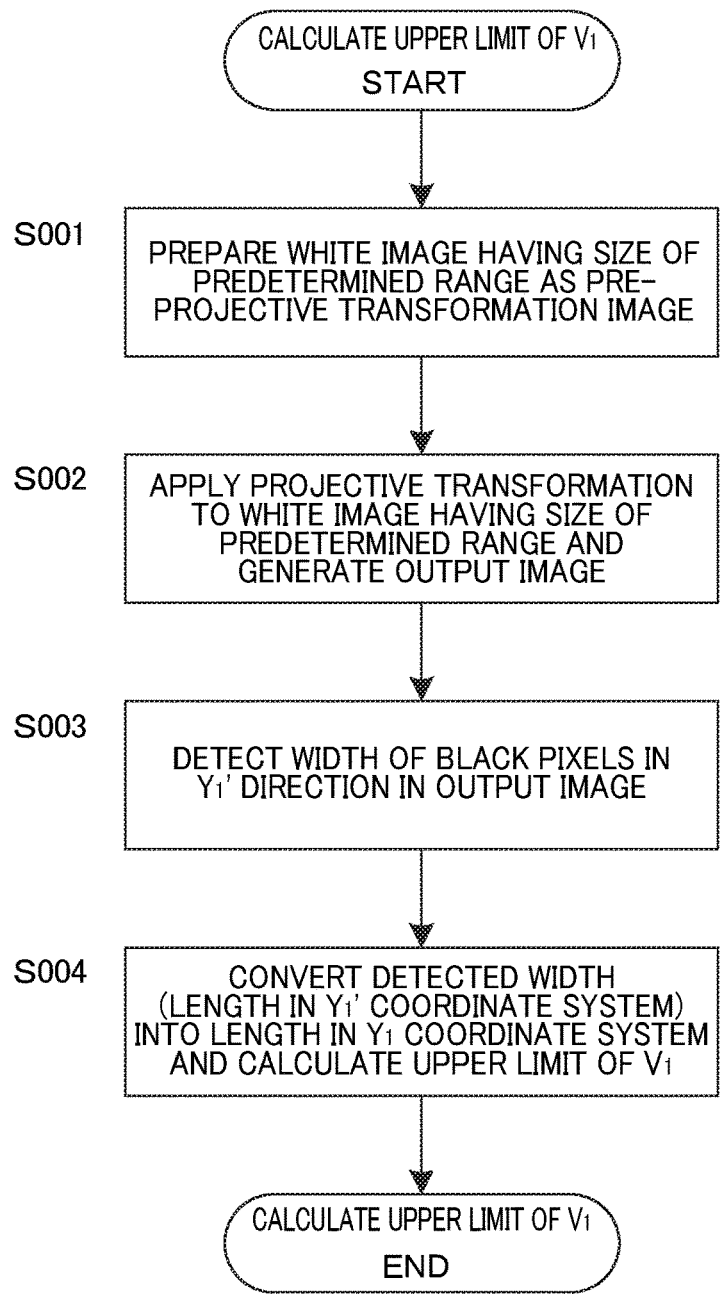
FIG. 9 is a flow diagram of a method of calculating an upper limit of $V_1$.
Figure 10:
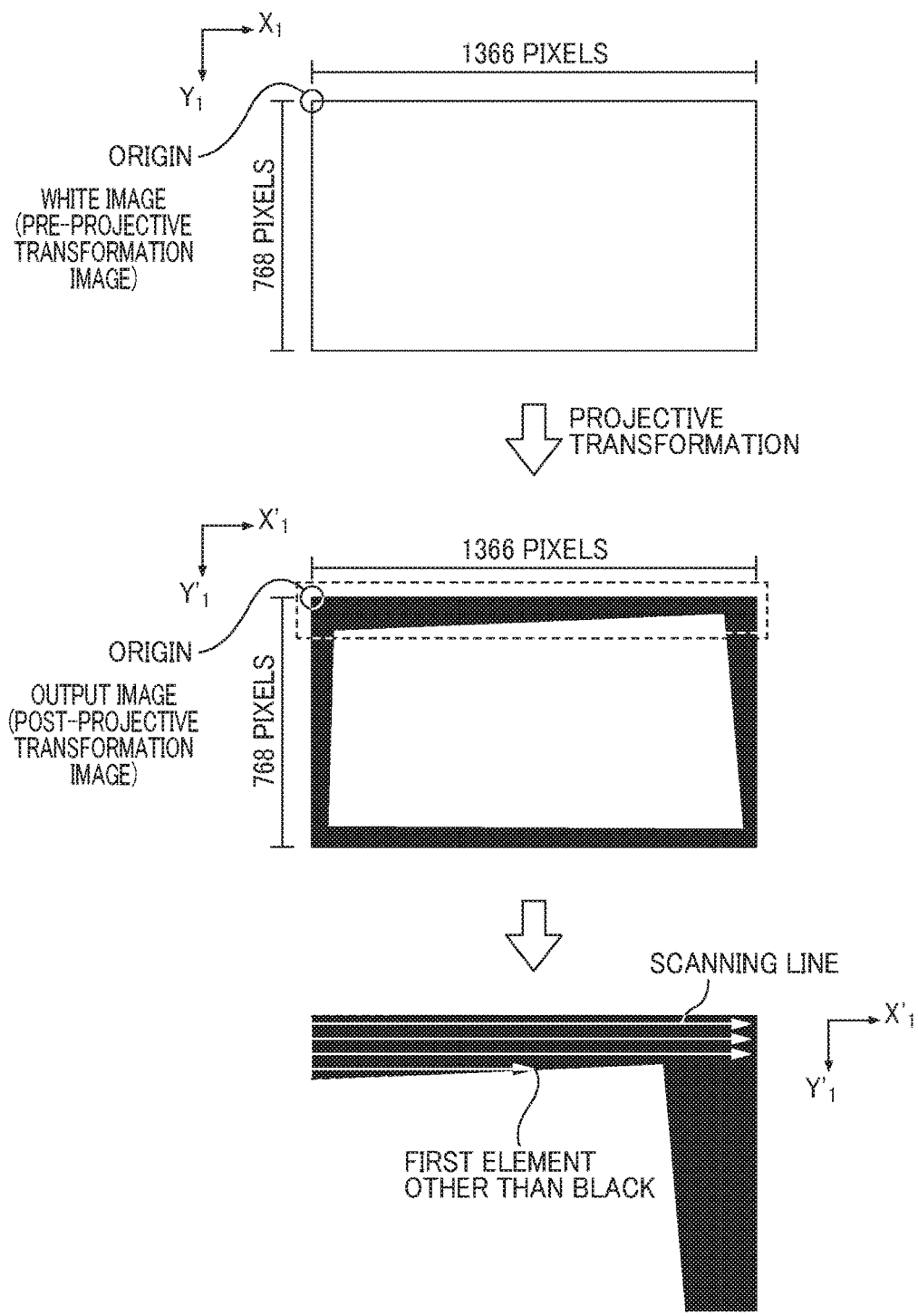
FIG. 10 is a graphical representation for describing how the upper limit of $V_1$ is calculated.

FIG. 9 is a flow diagram of a method of calculating an upper limit of $V_1$. FIG. 10 is a graphical representation for describing how the upper limit of $V_1$ is calculated.

First, the range calculator 35G prepares a white image having a size of the predetermined range as the pre-projective transformation image (S001). The size of the white image (predetermined range) is 1366 by 768 pixels as shown in FIG. 10.

Next, the range calculator 35G causes the projective transformer 35E to apply projective transformation to the white image to which no projective transformation has been applied and generate an output image (S002). The operation to apply projective transformation at this step is similar to the operation to apply projective transformation described in FIG. 3. The output image to which projective transformation has been applied has a resolution that is the same as the resolution of the image outputted to the first projector 21. Specifically, it has a resolution of 1366 by 768 pixels.

In the output image shown in FIG. 10, each pixel along the upper edge (see, the dotted line in the figure: the edge adjacent to the modeling area of the second projector 22 in the projected image) has a color value of black (the darkest luminance level). The coordinates in the pre-projective transformation image ($X_1$-$Y_1$ coordinate system) corresponding to the coordinates of the black pixels in the output image (integer coordinates: $X_1'$-$Y_1'$ coordinate system) are located outside the white image. The modeling area of the first projector 21 is able to be overlapped with the modeling area of the second projector 22 by an amount equal or substantially equal to a width of the black pixels along the upper edge of the output image.

Next, the range calculator 35G detects a width of the black pixels (i.e., a width in the $Y_i'$ direction) along the upper edge of the output image (the side adjacent to the modeling area of the second projector 22 in the projected image) (S003). As shown in FIG. 10, the range calculator 35G determines whether the color value of each pixel on a scanning line from the origin of the output image in the $X_1'$ direction is black or not. When all pixels on the scanning line have a color value of black, then the range calculator 35G shift the scanning line by one pixel and repeats to determine whether the color value of each pixel on the scanning line in the $X_1'$ direction is black or not. When detecting a first pixel having a color value other than black, the range calculator 35G considers a number 1 less than the value of the $Y_1'$ coordinate of the detected pixel as "the width of the black pixels in the output image in the $Y_1'$ direction."

Next, the range calculator 35G converts the width (a length in a $Y_1'$ coordinate system) detected at S003 into a length in a $Y_1$ coordinate system. For example, when a length of an illumination area of the first projector 21 in the U-direction (corresponding to the Y-direction) is designed to be about 45 mm, a length of the modeling area of the first projector 21 in the U-direction (corresponding to the Y-direction) is about 42 mm, and the pixel detected first as the pixel having a color value other than black at S003 has a $Y_i'$ coordinate of about 29, then $V_1$, which is the upper limit, is calculated as 30 pixels according to the following equation.

42 (mm):45 (mm)=29−1 (pixels):$V_1$ (pixels)

$V_1$=30 (pixels)

With the aforementioned operation, the range calculator 35G is able to calculate the upper limit of $V_1$ that can be set. When the modeling area of the first projector 21 is overlapped with the modeling area of the second projector 22, the extraction processor 35B of the image processor 35 sets $V_1$ to have a value of 30 pixels or less and extracts the upper of the slice image at a size of 1366 by (768+$V_1$) pixels so that the extracted image is extended, in the $Y_0$-direction, by $V_1$ pixels from the boundary (reference boundary) between the halves.

Second Preferred Embodiment

In the first preferred embodiment, when the range to extract in the slice image to obtain the extracted image is changed from the predetermined range (1366 by 768 pixels), the range for extraction is extended in $Y_i$ ($Y_1$-direction or $Y_2$-direction). The direction in which the range for extraction is changed is not limited to the $Y_i$-direction. In addition, in the first preferred embodiment, the pre-projective transformation images (flipped images) for the first projector and the second projector 22 are both translated. As described below, however, it is not necessary to translate the image in the case where a coordinate of the pixels of the pre-projective transformation image has not been changed from the coordinate obtained in the case where the extracted image is obtained in the predetermined range even when the range to extract to obtain the extracted image is changed from the predetermined range (1366 by 768 pixels). This is described now.

Figure 11:
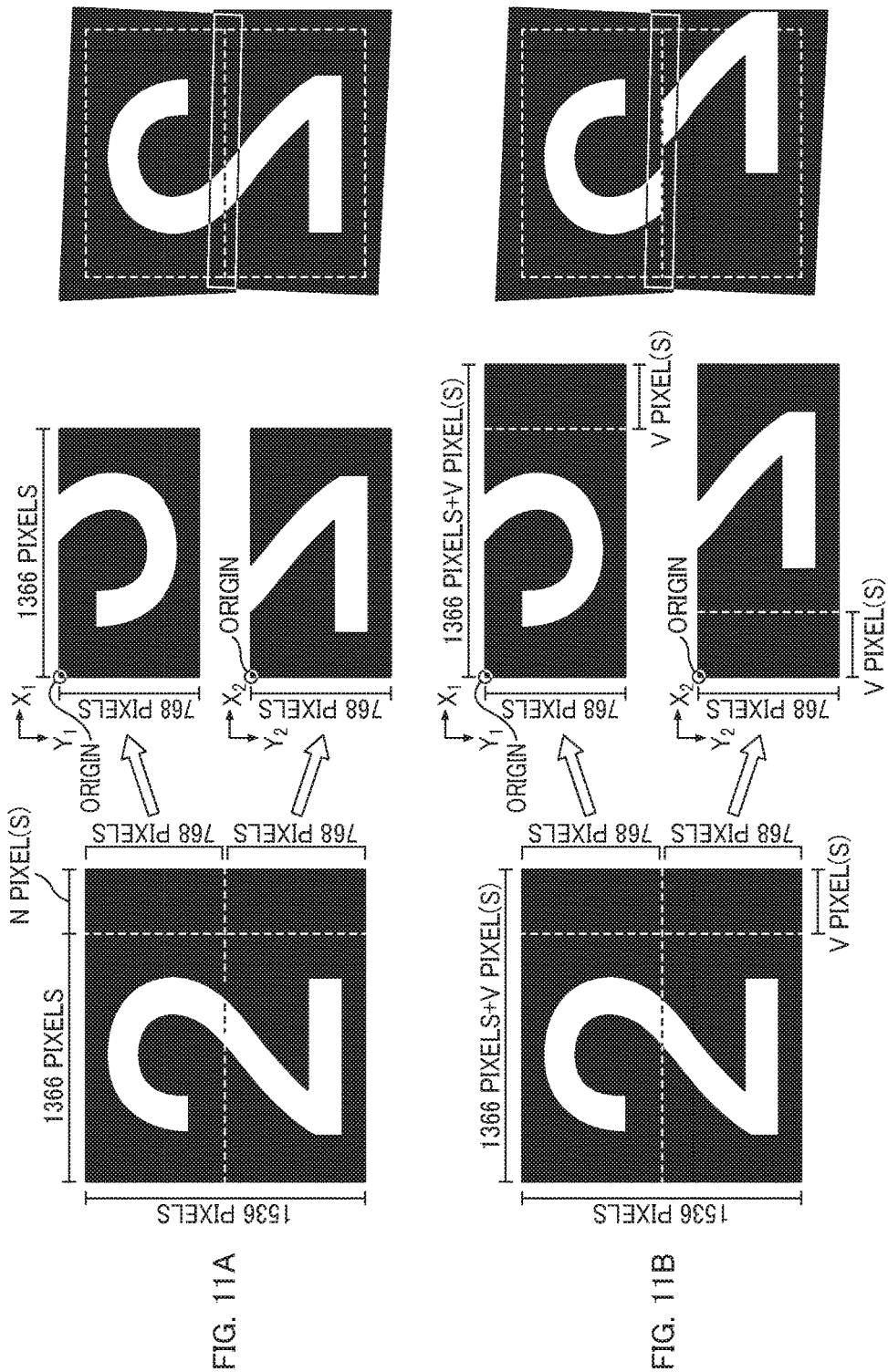
FIGS. 11A and 11B are graphical representations for describing a problem expected in a second preferred embodiment of the present invention.

FIGS. 11A and 11B are graphical representations for describing a problem expected in a second preferred embodiment of the present invention.

As shown in FIG. 11A, a slice image in the second preferred embodiment is wider than that in the first preferred embodiment by V pixel (s) in an $X_0$-direction and has a resolution of (1366+V) by 1536 pixels. If, however, each extracted image is obtained from this slice image in the predetermined range (1366 by 768 pixels), projected images are projected correctly as in the aforementioned case shown in FIG. 5A.

FIG. 11B is a graphical representation showing a problem that occurs when the extracted image is extended by V pixel(s) in an $X_i$-direction. The extraction processor 35B extracts, as an image to be outputted by the first projector 21, an upper portion of the slice image at a size of (1366+V) by 768 pixels so that the extracted image is extended, in the $X_0$-direction, by V pixel(s) as compared to the predetermined range (1366 by 768 pixels). The extraction processor 35B also extracts, as an image to be outputted by the second projector 22, a lower portion of the slice image at a size of (1366+V) by 768 pixels so that the extracted image is extended, in the $X_0$-direction, by V pixel(s) as compared to the predetermined range (1366 by 768 pixels).

The figure at the center in FIG. 11B shows flipped versions of the extracted images before application of projective transformation. Each of these pre-projective transformation images has a resolution of (1366+V) by 768 pixels. Furthermore, the origin of each pre-projective transformation image (i.e., the origin of the $X_i$-$Y_i$ coordinate system) is located at the upper left corner of each rectangle.

As to the pixels of the origins in the flipped images in the portion of the figure at the center in FIG. 11B, the pixel of the origin of the image for the first projector 21 has not been changed while the pixel of the origin of the image for the second projector 22 has been changed by V pixel(s) in the Y2-direction, as compared to the case (where the extracted images are obtained in the predetermined ranges) in FIG. 11A.

The portion of the figure to the right in FIG. 11B shows a projected image on the surface for projection. The application of the aforementioned projective transformation alone to the images shown in the portion of the figure at the center in FIG. 11B results in the projection of an image that is different from the slice image, as shown in the portion of the figure to the right in FIG. 11B. This is because, although the coordinates of the pixels of the pre-projective transformation images for the second projector 22 are different by V pixel unit(s), the same projective transformation as the one described above is applied.

Figure 12:
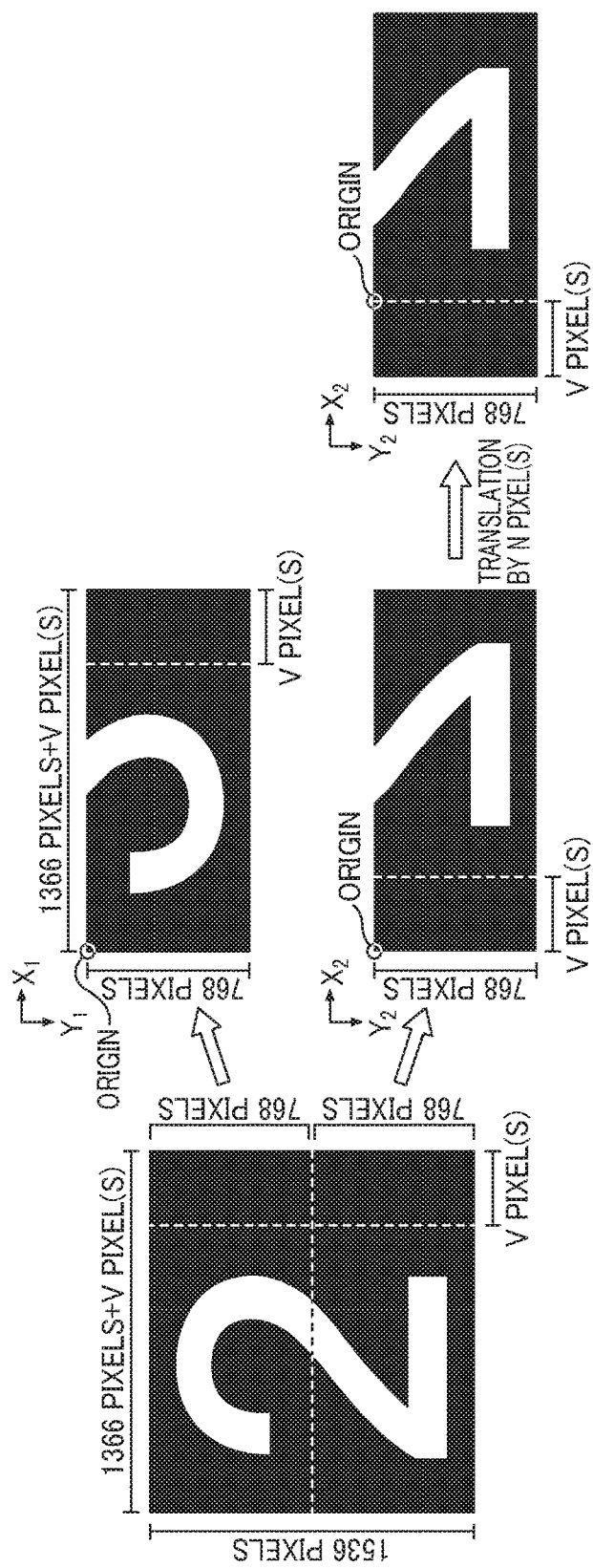
FIG. 12 is a graphical representation for describing translation in the second preferred embodiment of the present invention.

FIG. 12 is a graphical representation for describing translation in the second preferred embodiment. The portions to the left and at the center in FIG. 12 are the same as the portions to the left and at the center in FIG. 11B.

In the second preferred embodiment, the translation processor 35D translates the pre-projective transformation image (flipped image) for the second projector 22. In the translated image, the position of the origin is displaced at a distance of V pixel(s) in an $X_2$-direction, as compared to the image before translation. In other words, the coordinates of the pixels of the translated image have changed by V pixel unit(s) in the negative $Y_2$-direction.

Given coordinates in a pre-translation image are represented as ($x_2$,$y_2$) and coordinates in a post-translation image are represented as ($x_2$",$y_2$"), and a translation matrix of the second preferred embodiment is T, then the relationship between the coordinates before and after the translation can be put into a matrix form as follows.

$$\begin{pmatrix} x_2'' \\ y_2'' \\ 1 \end{pmatrix} = T_i \cdot \begin{pmatrix} x_2 \\ y_2 \\ 1 \end{pmatrix}, T_i = \begin{pmatrix} 1 & 0 & -V \\ 0 & 1 & 0 \\ 0 & 0 & 1 \end{pmatrix}$$

In the second preferred embodiment, the translation processor 35D does not translate the pre-projective transformation image (flipped image) for the first projector 21. This is because the coordinates of the pre-projective transformation image in the case where the range to extract to obtain the extracted image for the first projector 21 has been changed do not change from the coordinates in the case where the extracted images are obtained in the predetermined range (see, the figure at the center in FIG. 11A) and therefore the projected image is projected in the modeling area of the first projector 21.

In the second preferred embodiment, the first projector 21 outputs, without any translation, an output image to which projective transformation has been applied, and the second projector 22 outputs an output image to which translation and projective transformation have been applied. As a result, an image represented by the slice image is able to be projected correctly onto the surface for projection.

Other Preferred Embodiments

The foregoing preferred embodiments have been provided as examples and are not intended to limit the scope of the present invention. The aforementioned configurations can be implemented in appropriate combinations, and various omissions, replacements, and changes can be made without departing from the essential features of the present invention. The above preferred embodiments and modifications thereof are included in the scope and spirit of the present invention as well as within the present invention described in the claims and their equivalents.

In the aforementioned preferred embodiments, the projection system including the projector assembly 20 and the controller 30 is preferably used for the modeling machine 1, but the projection system is not limited thereto. For example, the projection system may be used as a large-scale projector to project projected images onto a large screen. In addition, the projection system in the aforementioned preferred embodiments preferably includes two projectors (projectors), but the number of the projectors may be one or two or more.

In the aforementioned preferred embodiments, when the range to extract in the slice image (source image) to obtain the extracted image is changed from the predetermined range (1366 by 768 pixels, for example), the range for extraction is extended in the $Y_i$-direction ($Y_1$-direction or $Y_2$-direction). However, the direction in which the range for extraction is changed may be in the $X_i$-direction ($X_1$-direction or $X_2$-direction). In such a case, the range calculator 35G detects a width of the black pixels (i.e., a width in the $X_i'$ direction) along an edge of the output image in the $X_i$-direction in the aforementioned operation at S003 and the width (a length in the $X_i'$ coordinate system) detected at S003 is able to be converted into a length in the $X_i$ coordinate system at S004.

In the aforementioned preferred embodiments, preferably, both of the pre-projective transformation images (flipped images) for the first and second projectors 21 and 22 are translated. It is, however, not necessary to translate the images in the case where a coordinate of the pixels of the pre-projective transformation image has not been changed from the coordinate obtained in the case where the extracted image is obtained in the predetermined range even when the range to extract to obtain the extracted image is changed from the predetermined range (1366 by 768 pixels, for example) because a problem of misalignment of the images as shown in the portion of the figure to the right in FIG. 5B will not occur.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A projection system comprising:
  a projector assembly;
  a storage that stores parameters for projective transformation; and
  a controller that generates a pre-projective transformation image based on an extracted image obtained from a source image by the controller, applies projective transformation to the pre-projective transformation image using the parameters to produce an output image, and causes the projector assembly to output the output image and project a projected image on a surface for projection; wherein
  in a case where the extracted image has been obtained in a predetermined range of the source image by the controller, the projected image is projected onto the surface for projection so that the pre-projective transformation image is located at a predetermined position in the surface for projection; and
  when a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image.

2. The projection system according to claim 1, wherein the projector assembly includes a first projector and a second projector; wherein
  when the controller causes each of the first projector and the second projector to output the output image to project the projected images as a single image onto the surface for projection, the range to extract in the source image to obtain the extracted image is changed from the predetermined range so that an area onto which an image corresponding to the extracted image is projected by the first projector is overlapped with an area onto which an image corresponding to the extracted image is projected by the second projector.

3. The projection system according to claim 1, wherein when a change, from the predetermined range, of the range to extract in the source image to obtain the extracted image does not lead to the change of the coordinate of the pixels obtained in the case where the extracted image has been obtained in the predetermined range;
  the output image is produced by applying projective transformation to, but not translating, the pre-projective transformation image.

4. The projection system according to claim 1, wherein the controller applies projective transformation to a white image of the predetermined range as the pre-projective transformation image to obtain the output image;
  detects a width of black pixels on an edge of the output image; and
  converts a dimension of the width in a coordinate system of the output image into a length in a coordinate system of the extracted image to calculate a range to extract in the source image from which the extract image can be obtained.

5. A modeling machine comprising:
  a resin vat to contain a photosensitive resin and including a transparent bottom;
  a projector assembly that projects a projected image onto the bottom as a surface for projection;
  a storage that stores parameters for projective transformation; and
  a controller that generates a pre-projective transformation image based on an extracted image obtained from a source image by the controller, applies projective transformation to the pre-projective transformation image using the parameters to produce an output image, and causes the projector assembly to output the output image and project the projected image on the surface for projection; wherein
  in a case where the extracted image has been obtained in a predetermined range of the source image by the controller, the projected image is projected onto the surface for projection so that the pre-projective transformation image is located at a predetermined position in the surface for projection; and wherein when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image.

6. A projection system comprising:

a projector assembly;

a storage that stores parameters for projective transformation; and a controller that generates a pre-projective transformation image based on an extracted image obtained from a source image by the controller, applies projective transformation to the pre-projective transformation image using the parameters to produce an output image, and causes the projector assembly to output the output image and project a projected image on a surface for projection; wherein in a case where the extracted image has been obtained in a predetermined range of the source image by the controller, the projected image is projected onto the surface for projection so that the pre-projective transformation image is located at a predetermined position in the surface for projection; and the controller applies projective transformation to a white image of the predetermined range as the pre-projective transformation image to obtain the output image, detects a width of black pixels on an edge of the output image, and converts a dimension of the width in a coordinate system of the output image into a length in a coordinate system of the extracted image to calculate a range to extract in the source image from which the extract image is capable of being obtained.

7. The projection system according to claim 6, wherein the projector assembly includes a first projector and a second projector; wherein when the controller causes each of the first projector and the second projector to output the output image to project the projected images as a single image onto the surface for projection, the range to extract in the source image to obtain the extracted image is changed from the predetermined range so that an area onto which an image corresponding to the extracted image is projected by the first projector is overlapped with an area onto which an image corresponding to the extracted image is projected by the second projector.

8. The projection system according to claim 6, wherein when, a change, from the predetermined range, of a range to extract in the source image to obtain the extracted image leads to a change of a coordinate of pixels of the pre-projective transformation image by a V pixel unit from a coordinate obtained in the case where the extracted image has been obtained in the predetermined range, the controller translates the pre-projective transformation image by a V pixel and applies projective transformation to the pre-projective transformation image using the parameters to produce the output image.

9. A modeling machine comprising:

a resin vat to contain a photosensitive resin and including a transparent bottom;

a projector assembly that projects a projected image onto the bottom as a surface for projection;

a storage that stores parameters for projective transformation; and a controller that generates a pre-projective transformation image based on an extracted image obtained from a source image by the controller, applies projective transformation to the pre-projective transformation image using the parameters to produce an output image, and causes the projector assembly to output the output image and project the projected image on the surface for projection; wherein in a case where the extracted image has been obtained in a predetermined range of the source image by the controller, the projected image is projected onto the surface for projection so that the pre-projective transformation image is located at a predetermined position in the surface for projection; and the controller applies projective transformation to a white image of the predetermined range as the pre-projective transformation image to obtain the output image, detects a width of black pixels on an edge of the output image; and converts a dimension of the width in a coordinate system of the output image into a length in a coordinate system of the extracted image to calculate a range to extract in the source image from which the extract image can be obtained.

\* \* \* \* \*